(12) United States Patent
Marcy et al.

(10) Patent No.: US 12,455,147 B2
(45) Date of Patent: Oct. 28, 2025

(54) WATERFRONT BARRIER SYSTEM

(71) Applicant: Oceanetics, Inc., Annapolis, MD (US)

(72) Inventors: Matt Marcy, Bluemont, VA (US); Erick Knezek, Lafayette, LA (US); James Douglas Andersen, Oxnard, CA (US); William Newton Seelig, Rockville, MD (US); David Delleart, Washington, MO (US); Mark Herbert Wood, Tarpon Springs, FL (US); Christopher Paul Pacheco, Portsmouth, RI (US)

(73) Assignee: OCEANETICS, INC., Annapolis, MD (US)

( * ) Notice: Subject to any disclaimer, the term of this patent is extended or adjusted under 35 U.S.C. 154(b) by 146 days.

(21) Appl. No.: 17/782,380

(22) PCT Filed: Dec. 19, 2020

(86) PCT No.: PCT/US2020/066273
§ 371 (c)(1),
(2) Date: Jun. 3, 2022

(87) PCT Pub. No.: WO2021/127605
PCT Pub. Date: Jun. 24, 2021

(65) Prior Publication Data
US 2023/0023351 A1 Jan. 26, 2023

Related U.S. Application Data

(60) Provisional application No. 62/950,216, filed on Dec. 19, 2019.

(51) Int. Cl.
F41H 11/05 (2006.01)
E02B 3/04 (2006.01)
E02B 3/20 (2006.01)

(52) U.S. Cl.
CPC ............... *F41H 11/05* (2013.01); *E02B 3/04* (2013.01); *E02B 3/20* (2013.01)

(58) Field of Classification Search
IPC ........................... F41H 11/05; E02B 3/04,3/20
See application file for complete search history.

(56) References Cited

U.S. PATENT DOCUMENTS

| | | | | |
|---|---|---|---|---|
| 4,272,214 A | * | 6/1981 | Nyfeldt | E02B 15/08 405/72 |
| 4,712,944 A | * | 12/1987 | Rose | E02B 3/064 405/21 |

(Continued)

*Primary Examiner* — Kyle Armstrong
(74) *Attorney, Agent, or Firm* — LAW OFFICE OF JESSE D. LAMBERT, LLC

(57) ABSTRACT

A floating barrier float section, and a waterfront barrier system formed from a number of connected float sections. An elongated main flotation tube has radially outwardly extending fence posts with connecting members, such as nets, between them, forming multiple longitudinal net sections about the circumference of the flotation tube, at least one of the net sections extending upwardly and forming a barrier to vessel passage. A vessel strike tends to rotate the flotation tube about its longitudinal axis, absorbing the energy from the strike and rotating the flotation tube to bring another net section into position. An underwater ballast member and a stabilizer float member may be added for additional resistance to rotation.

18 Claims, 7 Drawing Sheets

(56) References Cited

U.S. PATENT DOCUMENTS

| | | | | |
|---|---|---|---|---|
| 7,110,625 B2* | 9/2006 | Chun | .................. | G02B 6/4469 |
| | | | | 385/100 |
| 8,622,650 B2* | 1/2014 | Lifton | .................. | E01F 15/086 |
| | | | | 404/6 |
| 2011/0227731 A1* | 9/2011 | Iffergan | .................. | F41H 11/05 |
| | | | | 114/294 |
| 2019/0145743 A1* | 5/2019 | Osienski | .................. | E02B 3/04 |
| | | | | 405/211 |

* cited by examiner

WATERFRONT BARRIER SYSTEM

CROSS REFERENCE TO RELATED APPLICATIONS

This non-provisional patent application claims priority to U.S. provisional patent application Ser. No. 62/950,216, filed Dec. 19, 2019, for all purposes. The disclosure of that provisional patent application is incorporated herein, to the extent not inconsistent with this application.

BACKGROUND—FIELD OF THE INVENTION

This invention relates to floating barriers to control vessel access.

Vessel entry into ports, harbors, docking areas, along waterways, etc. must often be controlled. Various waterborne threats, including but not limited to surface vessels, present issues for personnel and asset safety. Various forms of floating barriers have been developed.

There is a need for an improved floating barrier to control vessel passage.

SUMMARY OF THE INVENTION

The floating barrier system embodying the principles of the present invention, in one embodiment, comprises one or more sections of floating barrier having various structural elements adapted to stop waterfront threats, e.g. an approaching surface vessel, in short distances. Each section comprises an elongated buoyant flotation tube having a longitudinal axis with one or more fence sections running along substantially the entire length of the flotation tube, the flotation tube and fence sections forming float sections. The main flotation tube may be foam filled, to ensure flotation even in the event that the tube (that is, the outer wall) is damaged. Viewed longitudinally from an end of a flotation tube, the fences radiate outward from the surface of the flotation tube. While one embodiment has four fences, it is understood that any number could be used.

The fences comprise a plurality of spaced-apart fence posts, connected by fence connecting members which may take the form of longitudinal elements, netting, a combination of longitudinal and perpendicular elements, or any other arrangement.

The entirety of the barrier system may preferably be made of non-corrosive materials, such as carbon-filled materials; fiber reinforced plastics; HDPE (high density polyethylene), PE (polyethylene), and/or any other types of plastics or combinations thereof, etc. Alternatively, metals may be used, or a combination of metal and non-metal elements.

Since the barrier system has a plurality of fences, in the event of a vessel strike the system (namely, the float sections) rotates about the longitudinal axis of the main flotation tube; this rotation absorbs the energy of the vessel strike, and means that one or more fences are always presented as a barrier, even if an initial vessel strike is sufficiently hard to push one fence over (i.e. rotate the float section).

It is understood that the flotation tube has sufficient buoyancy to support the flotation tube and the fence sections at the surface of a waterbody, and when said flotation tube and fence sections are positioned on the waterbody surface at least one of said fence sections extends a sufficient distance radially outward from said flotation tube and above said waterbody surface so as to create an obstacle to vessel passage over the flotation tube. The direction of vessel movement toward the flotation tube defines an approach side of the flotation tube and a system of connected flotation tubes, with the opposite side of the flotation tube(s) defining a protected side.

Other embodiments of the barrier system comprise outwardly extending flotation arms and/or subsurface ballast arms, extending radially outward from the main flotation tubes.

DESCRIPTION OF THE PRESENTLY PREFERRED EMBODIMENT(S)

While various floating vessel barrier systems can embody the principles of the present invention, with reference to the drawings some of the presently preferred embodiments can be described.

Figure 1:
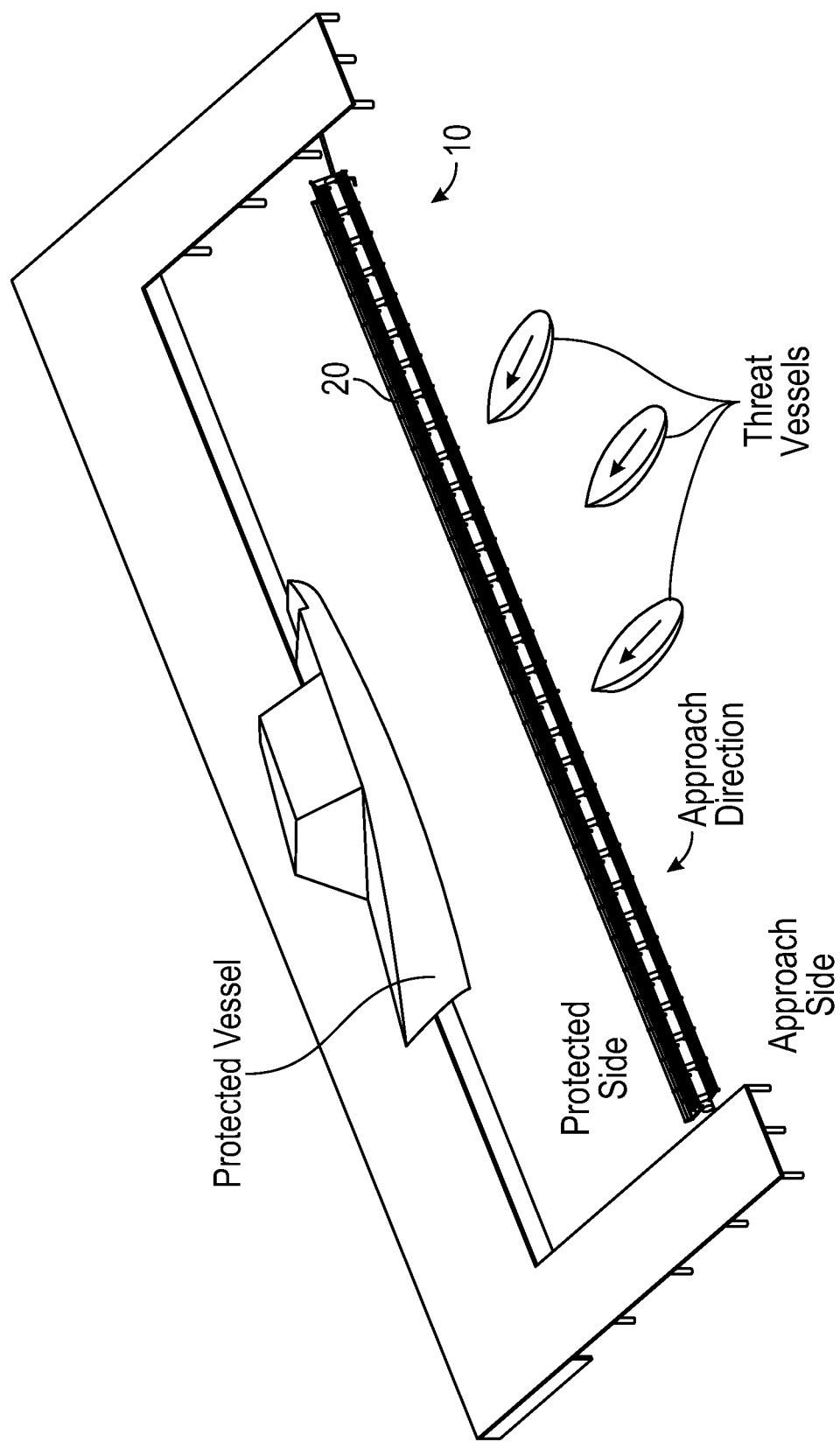
FIG. 1 is an environmental view showing an exemplary placement of the barrier system in a harbor or similar setting, with multiple float sections (of any of the embodiments) deployed.

FIG. 1 shows a general environmental view of an exemplary installation of floating barrier system 10. It is understood that the floating barrier system may be installed anywhere vessel passage must be controlled, whether across the entry to a port, harbor or the like; or across a river, stream, etc. While FIG. 1 shows floating barrier system 10 installed across the opening to a docking area, it is understood that other arrangements are possible, for example the floating barrier running back to a shoreline on each end, etc. "Threat vessels" are shown in FIG. 1, as representative of the type of vessels which may be blocked by the barrier system, with the approach direction noted. A protected side of the barrier system/float sections is shown, namely the side of the float sections opposite an approach side (that is, the side from which threat vessels would potentially approach). It is understood that floating barrier system 10 may be formed from any of the various embodiments of float sections described herein.

A First Embodiment

Figure 2:
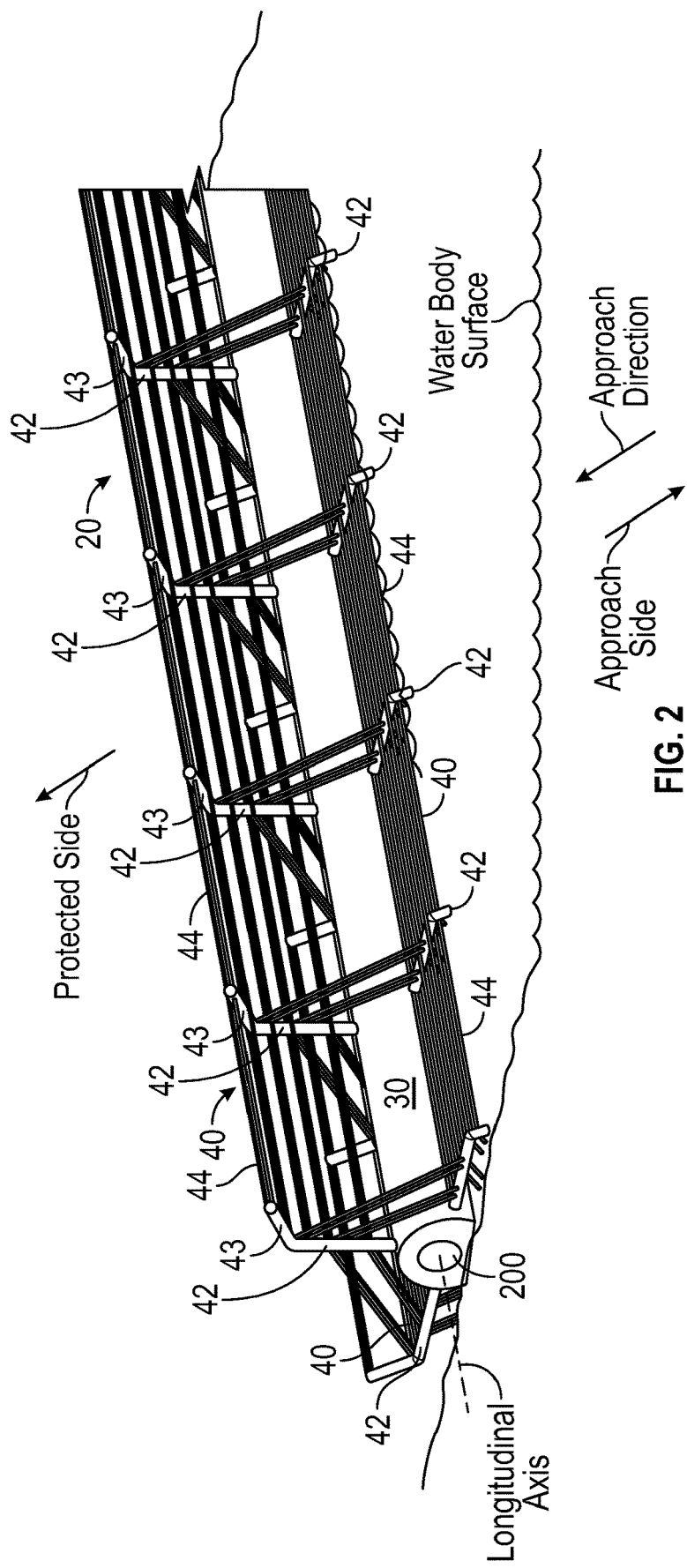
FIG. 2 is a perspective view of a section of a first embodiment of the vessel barrier system.
Figure 3:
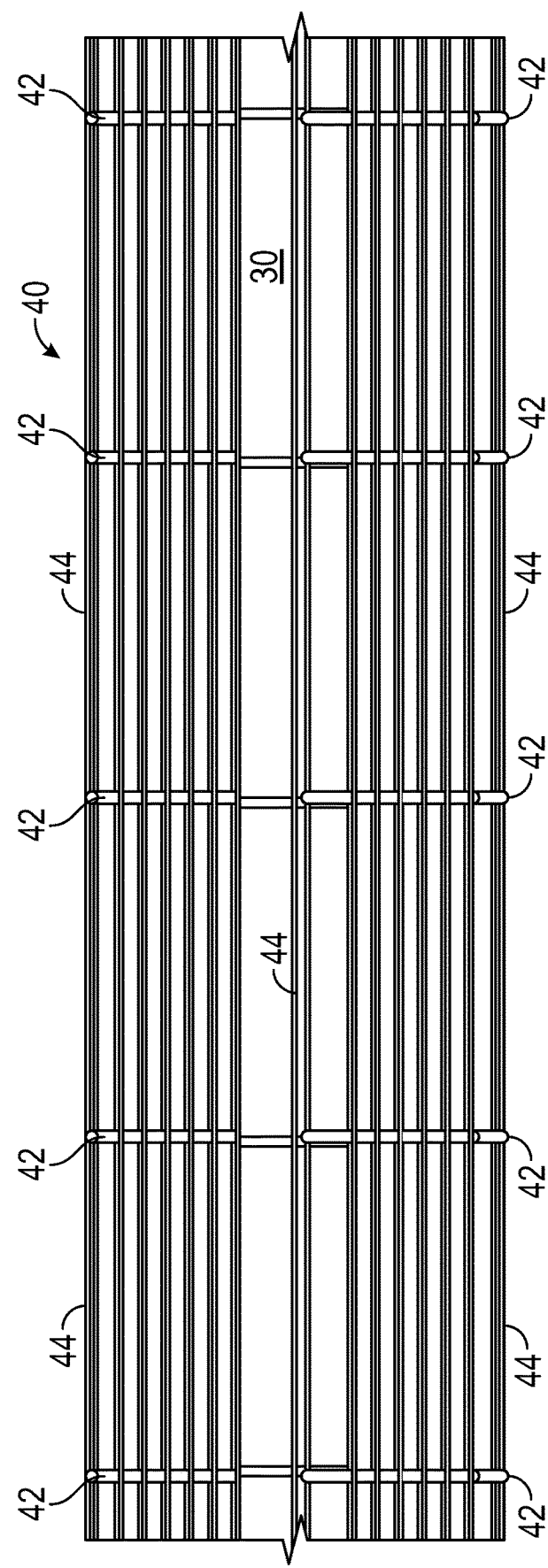
FIG. 3 is a front or face-on view of a section of a first embodiment of the vessel barrier system.
Figure 4:
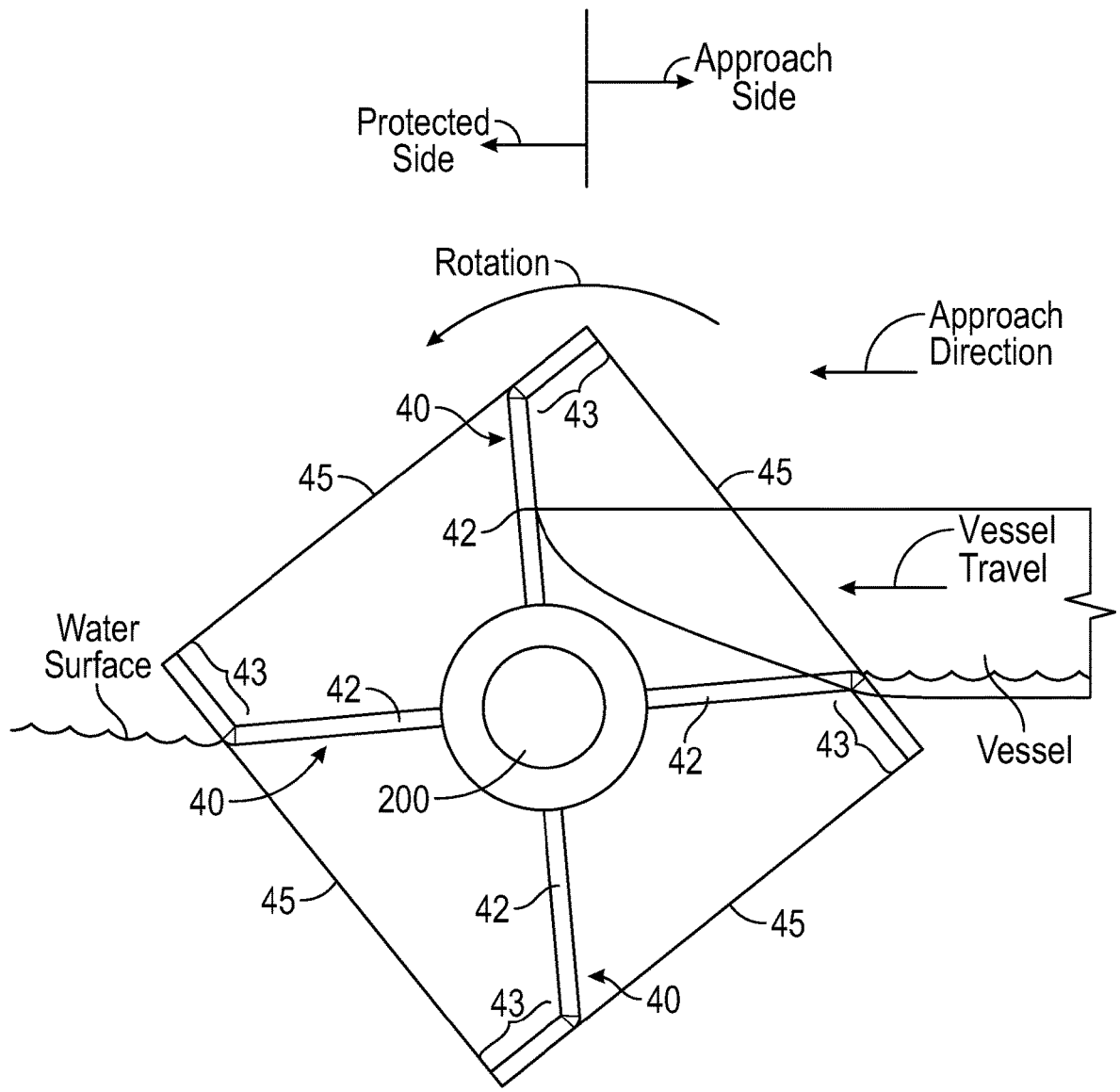
FIG. 4 is an end view along the longitude of a first embodiment barrier section, showing further detail of the fence posts and diagonal connector, and showing a vessel in position against the barrier section as in a vessel strike.

FIGS. 2-4 are perspective, front-on and end (longitudinal) views of one float section 20 of a first embodiment of the floating barrier 10 embodying the principles of the present invention. An elongated main flotation tube 30 may be formed from a non-corrosive material such as fiberglass, PVC, carbon-based material, etc. Alternatively, an aluminum or other metal material may be used. Preferably, main flotation tube 30 is filled with a closed cell foam so that main flotation tube 30 remains buoyant even in the event of a puncture of the tube.

A plurality of fence sections 40 are disposed on main flotation tube 30, radiating outwardly from the tube. In the embodiment shown in FIGS. 2-4, four fence sections are shown (in FIG. 2, one of the fences is below the water surface), but it is understood that the present invention comprises any number of fence sections. Generally, fence sections 40 comprise spaced apart fence posts 42 attached to flotation tube 30 and extending a desired distance outwardly from main flotation tube 30, with fence posts 42 preferably having an end section 43 (best seen in FIG. 4) which is angled toward an expected direction of an approaching vessel. The resulting angled fence section assists in preventing vessel passage over the fence.

Figure 2A:
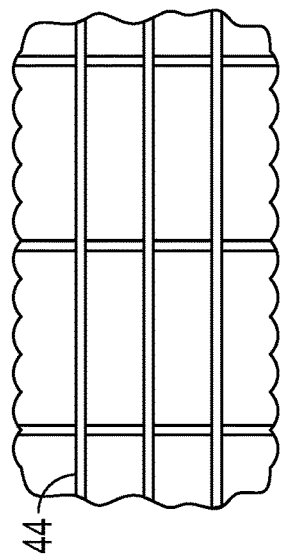
FIG. 2A is a view of an exemplary net embodiment of the fence connecting members.

Some form of fence connecting members 44 are supported by fence posts 42, to provide a barrier to vessel passage. In the figures, fence connecting members 44 are spaced apart cables or ropes formed from high strength fibers that extend longitudinally between fence posts 42. Alternatively, a mesh-type or net arrangement, with fence connecting members 44 disposed in some form of square or diagonal pattern, could be used. Fence connecting members 44 may also be rigid rods or bars. Various materials may be used for fence posts 42 and fence connecting members 44, from metals to various forms of non-corrosive, non-metallic materials. By way of example only, fence connecting members 44 may comprise a nylon net, see FIG. 2A, with horizontal members of approximately 1.25" diameter, spaced approximately 9" to 10" apart; and vertical members of approximately 1.00" diameter, spaced approximately 39" apart. It is understood that other netting materials, dimensions and spacing can be used.

FIG. 3 is a front or face-on view of an exemplary float section 20, seen from the perspective of an approaching vessel. It is understood that dimensions of main flotation tube 30, fence posts 42 and other elements of fence section 40 may be made as needed for a given application.

FIG. 4 is an end (longitudinal) view of a float section 20. Four fence sections 40 (and fence posts 42) are clearly shown, arrayed around the circumference of main flotation tube 30. Diagonal connectors 45 (which may be flexible or rigid members) may be added for structural support. The approach direction of a threat vessel is shown, along with the direction of rotation of float section 20 in the event of a vessel strike. FIG. 4 also illustrates a vessel in position as in a vessel strike. It is understood that the force of a vessel striking the float section may tend to rotate float section 20 in the direction shown, about the longitudinal axis (see annotation in FIG. 2) of flotation tube 30, absorbing the energy of the vessel and bringing another fence section into position above the water surface.

It is understood that barrier system 10 may be a long, continuous float section 20, with a single main flotation tube 30, or alternatively made of a number of float sections 20 with connectors 200 between the sections, as can be seen in FIG. 1. Fence 40 is preferably connected even between multiple float sections 20, so that the float sections rotate together in the event of a vessel strike; it is understood that connectors 200 rotationally lock float sections 20 together. As can be readily understood, in the event of a vessel strike, float section(s) 20 rotate if the strike is of sufficient force, ensuring that at least one fence section 40 is always present (i.e. rotated into an above-water position, presenting an obstacle to vessel passage) along the entire barrier length at all times, even after one or more previous attacks/vessel strikes.

A Second Embodiment

Figure 5:
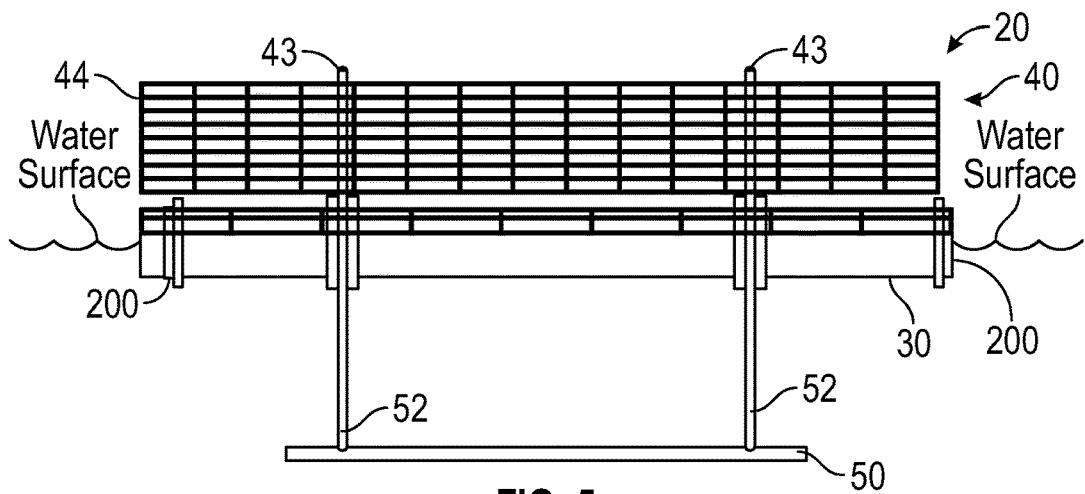
FIG. 5 is a front or face-on view of a section of a second embodiment of the vessel barrier system, having an underwater ballast member.
Figure 6:
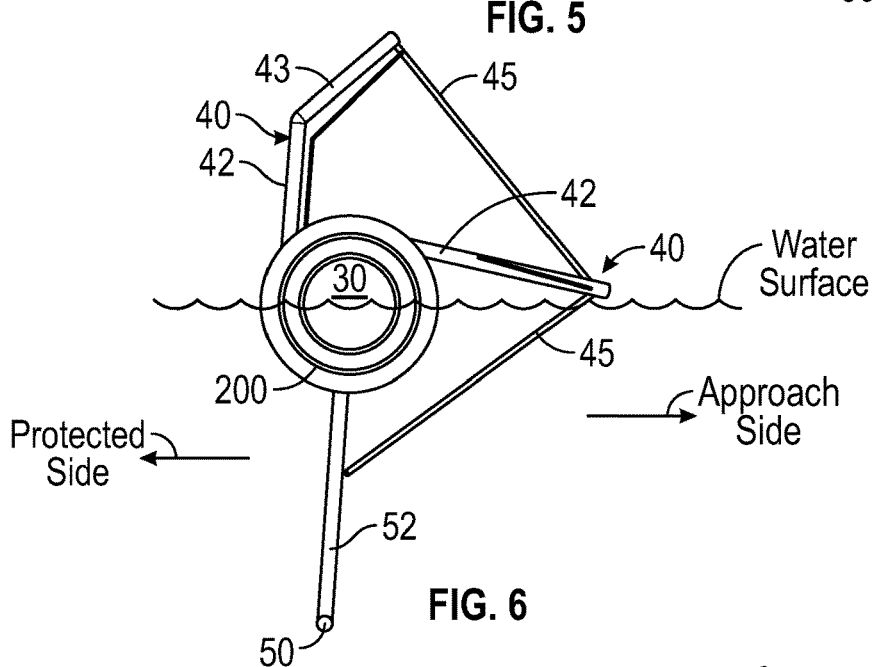
FIG. 6 is an end view along the longitude of the second embodiment barrier section of FIG. 5.
Figure 7:
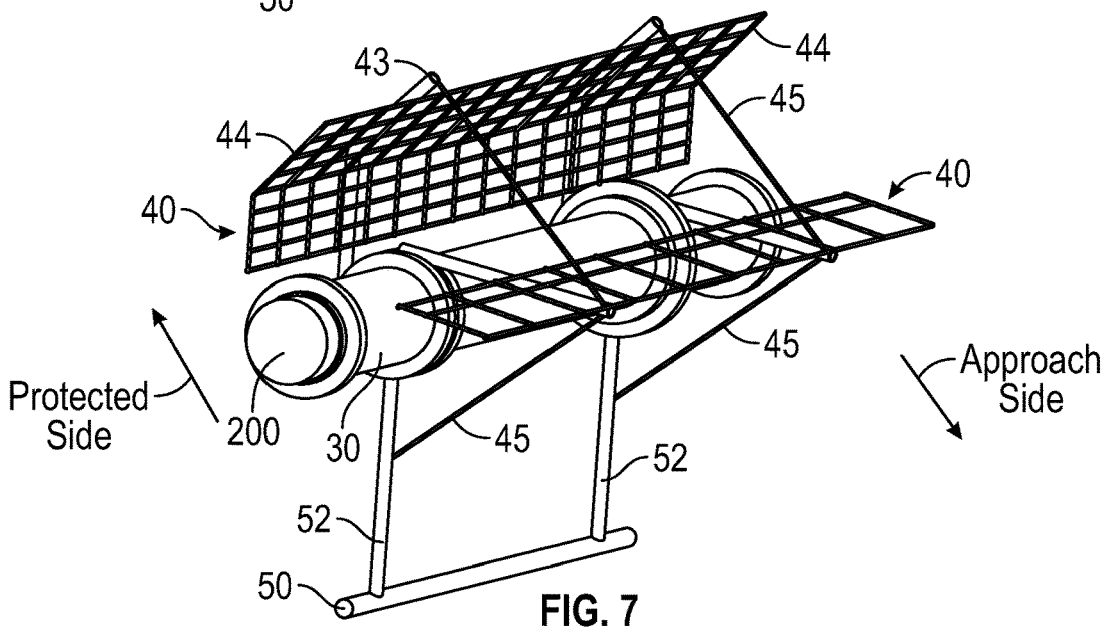
FIG. 7 is a perspective view of a section of the second embodiment of the vessel barrier system of FIGS. 5 and 6.

A second exemplary embodiment of float section 20 is shown in FIGS. 5-7. Flotation tube 30 comprises a fence section 40 extending upwardly from flotation tube 30 when flotation tube is floating on a waterbody, as in FIG. 5. One fence section 40 extends outwardly from flotation tube 30, generally along the surface of the waterbody, on the approach side of flotation tube 30. A ballast member 50 is attached to flotation tube 30 and extends downwardly below the surface of the waterbody, providing resistance to rotation of float section 20 about the longitudinal axis of flotation tube 30 due to a vessel strike.

Ballast member 50 is attached to flotation tube 30 by connecting members 52, so as to position ballast member a desired distance below the surface of the waterbody. Ballast member 50 may be at least partially hollow, so that it becomes a water filled container. Alternatively, ballast member 50 may be a weighted member, for example a solid metal member.

It is understood that other elements of the second exemplary embodiment are shared with the first exemplary embodiment and so numbered in the figures.

A Third Embodiment

Figure 8:
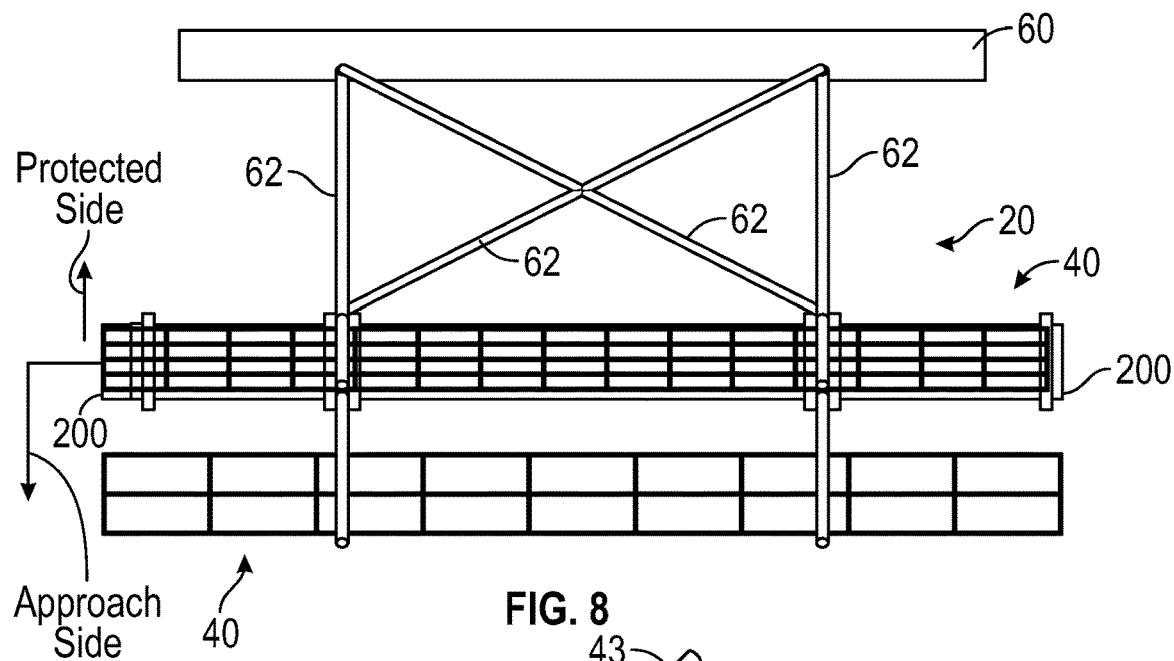
FIG. 8 is a top view of a section of a third embodiment of the vessel barrier system, having a rearwardly (protected side) stabilizer float member.
Figure 9:
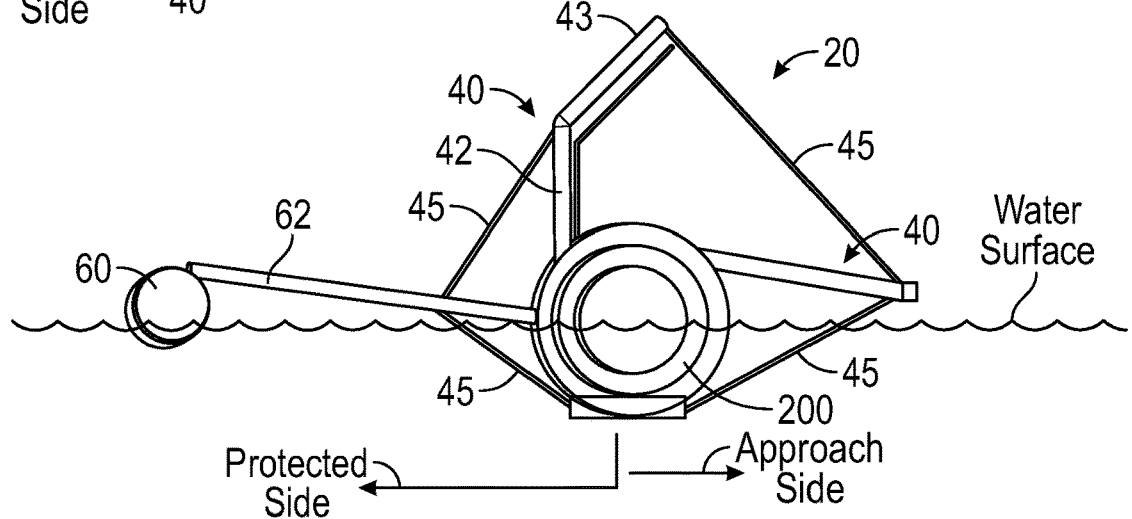
FIG. 9 is an end view along the longitude of the third embodiment barrier section of FIG. 8.
Figure 10:
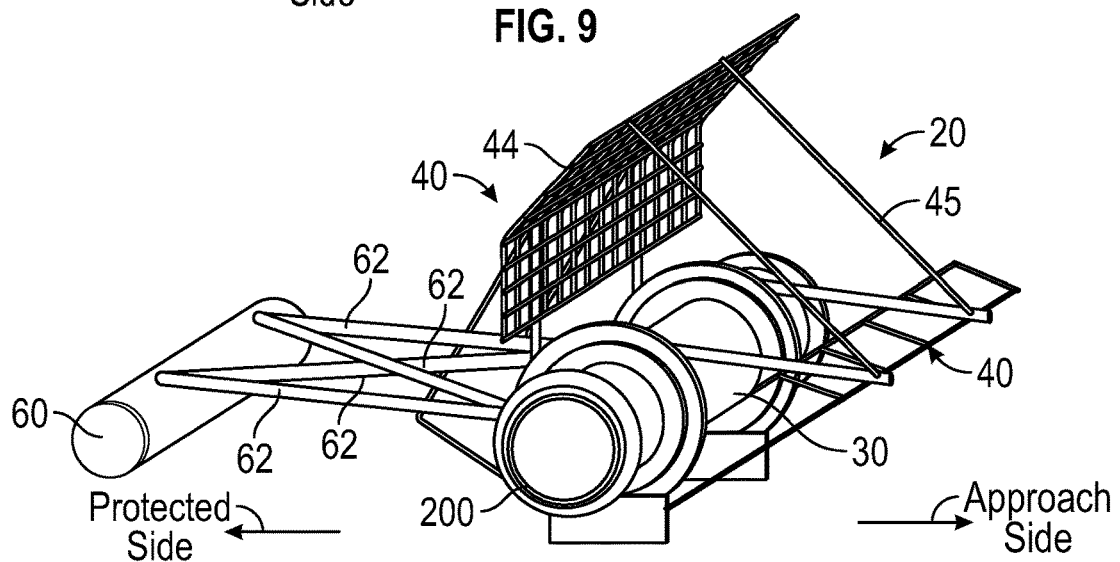
FIG. 10 is a perspective view of a section of the third embodiment of the vessel barrier system of FIGS. 8 and 9.

A third exemplary embodiment of float section 20 is shown in FIGS. 8-10. Flotation tube 30 comprises a fence section 40 extending upwardly from flotation tube 30 when flotation tube is floating on a waterbody, as in FIG. 9. One fence section 40 extends outwardly from flotation tube 30, generally along the surface of the waterbody, on the approach side of flotation tube 30. A stabilizer float member 60 is attached to flotation tube 30 and extends radially outward from flotation tube 30, on the protected side of flotation tube 30 (as shown in the figures), providing resistance to rotation of float section 20 about the longitudinal axis of flotation tube 30 due to a vessel strike.

Stabilizer float member 60 is attached to flotation tube 30 by connecting members 62, so as to position stabilizer float member 60 a desired distance away from flotation tube 30. Stabilizer float member 60 may be any buoyant member; for example, a hollow member made of metal or other suitable material. Stabilizer float member 60 may be foam filled if desired. The dimensions of stabilizer float member 60, its weight/buoyancy, the length of connecting members 62 may all be as desired to yield a desired resistance to rotation, to accommodate particular settings, etc.

It is understood that other elements of the third exemplary embodiment are shared with the first and second exemplary embodiment and so numbered in the figures.

Figure 11:
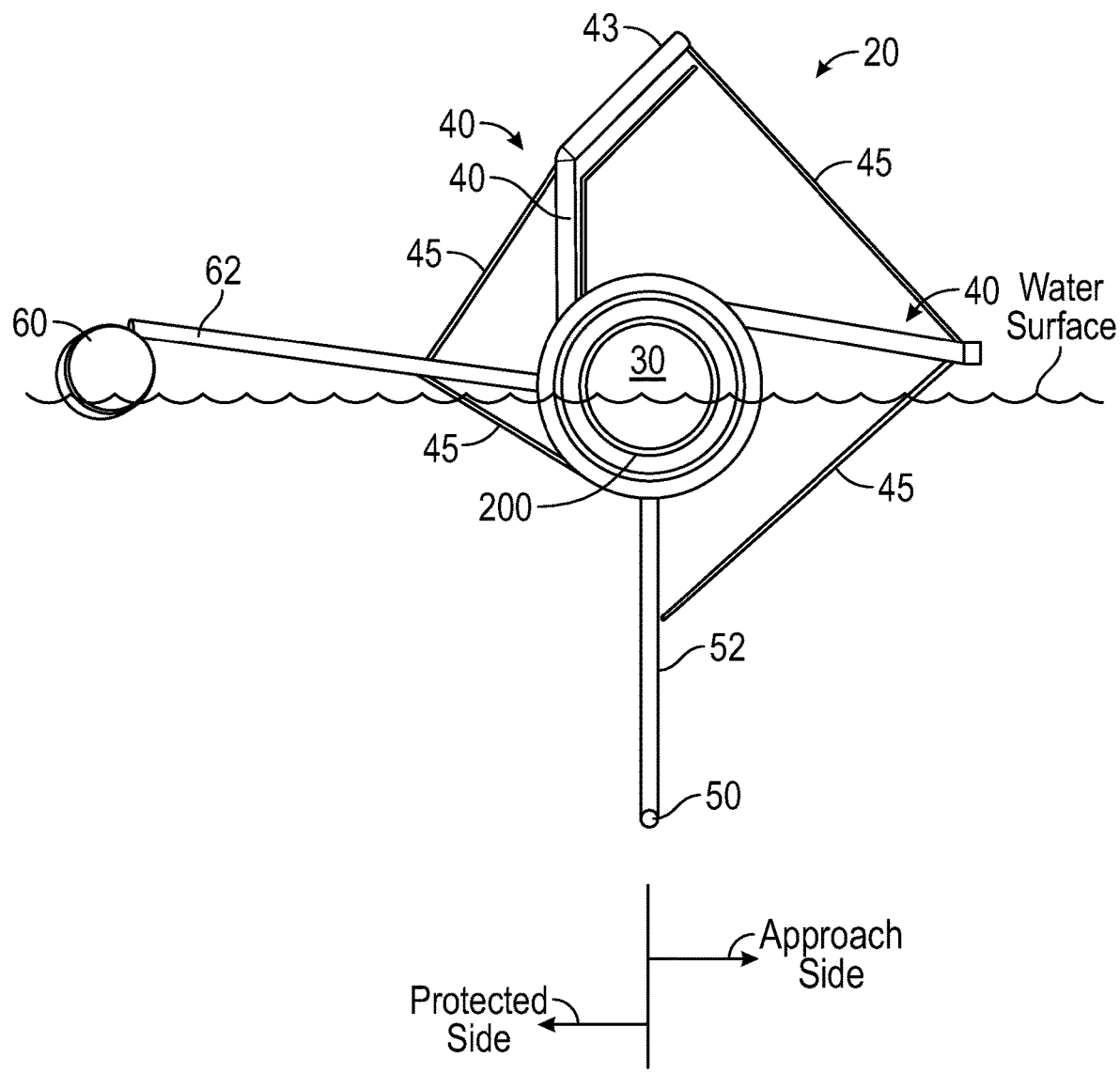
FIG. 11 is an end view along the longitude of another embodiment of a barrier section.

Yet another possible embodiment combines elements of the above described second and third embodiments, as shown in FIG. 11, namely a float section 20 comprising both ballast member 50 and stabilizer float member 60.

Materials and Dimensions

The entirety of the barrier system may preferably be made of non-corrosive materials, such as carbon-filled materials; fiber reinforced plastics; HDPE (high density polyethylene), PE (polyethylene), and/or any other types of plastics or combinations thereof, etc. Alternatively, metals may be used, or a combination of metal and non-metal elements. Dimensions may be changed to accommodate particular settings and installations.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, materials and dimensions may be changed to suit particular applications; the system may comprise one, two, three, four or even more fences, etc.

Therefore, the scope of the invention is to be determined not by the illustrative examples set forth above, but by the appended claims and their legal equivalents.

We claim:

1. An apparatus, comprising:
   an elongated buoyant flotation tube having a length and a longitudinal axis;
   a plurality of fence sections attached to said flotation tube spaced apart around a circumference of said flotation tube and extending radially outwardly therefrom, said fence sections spanning substantially the entirety of said length of said flotation tube, each of said fence sections comprising:
      a plurality of fence posts attached to said flotation tube and extending radially outwardly therefrom, and
      fence connecting members spanning the space between said fence posts,
   said flotation tube having sufficient buoyancy to support said flotation tube and said fence sections at the surface of a waterbody, and wherein when said flotation tube and fence sections are positioned on said waterbody surface at least one of said fence sections extends a sufficient distance radially outward from said flotation tube and above said waterbody surface so as to create an obstacle to vessel passage over said flotation tube, the direction of vessel movement toward said flotation tube defining an approach side of said flotation tube, with the opposite side of said flotation tube defining a protected side.

2. The apparatus of claim 1, wherein said plurality of fence sections comprises three or more fence sections spaced around a circumference of said flotation tube.

3. The apparatus of claim 2, wherein said plurality of fence sections comprises four or more fence sections spaced around a circumference of said flotation tube.

4. The apparatus of claim 3, wherein said plurality of fence sections comprises four fence sections spaced substantially equally around a circumference of said flotation tube.

5. The apparatus of claim 4, wherein:
   one or more of said fence posts comprises a section angled toward the direction of an approaching vessel; and
   said fence connecting members comprise a nylon net.

6. The apparatus of claim 5, further comprising support members connecting at least some of said fence posts to one another about a circumference of said flotation tube.

7. The apparatus of claim 1, wherein when said flotation tube and said fence sections are floating on a waterbody, at least one fence section extends upwardly from said flotation tube; and
   one of said fence sections extends outwardly from said flotation tube and generally along the surface of said waterbody, on said approach side of said flotation tube; and
   further comprising a ballast member attached to said flotation tube and extending downwardly below the surface of said waterbody, said ballast member providing resistance to rotation of said flotation tube about said longitudinal axis caused by a vessel strike.

8. The apparatus of claim 7, wherein:
   one or more of said fence posts comprises an end section angled toward the direction of an approaching vessel; and
   said fence connecting members comprise a nylon net.

9. The apparatus of claim 8, further comprising support members connecting at least some of said fence posts to one another about a circumference of said flotation tube.

10. The apparatus of claim 7, wherein said ballast member comprises a water filled member.

11. The apparatus of claim 7, wherein said ballast member comprises a weighted member.

12. The apparatus of claim 1, wherein when said flotation tube and said fence sections are floating on a waterbody, at least one fence section extends upwardly from said flotation tube; and
   further comprising a stabilizer float member attached to said flotation tube and extending radially outward from said flotation tube on said protected side of said flotation tube.

13. The apparatus of claim 12, further comprising support members connecting at least some of said fence posts to one another about a circumference of said flotation tube.

14. The apparatus of claim 1, wherein when said flotation tube and said fence sections are floating on a waterbody, at least one fence section extends upwardly from said flotation tube; and
   one of said fence sections extends outwardly from said flotation tube and generally along the surface of said waterbody, on said approach side of said flotation tube; and
   further comprising a ballast member attached to said flotation tube and extending downwardly below the surface of said waterbody, said ballast member providing resistance to rotation of said flotation tube about said longitudinal axis caused by a vessel strike; and
   further comprising a stabilizer float member attached to said flotation tube and extending radially outward from said flotation tube on said protected side of said flotation tube.

15. The apparatus of claim 14, wherein one or more of said fence posts comprises a section angled toward the direction of an approaching vessel; and
   further comprising support members connecting at least some of said fence posts to one another about a circumference of said flotation tube.

16. A waterfront barrier system, comprising:
   a plurality of float sections on a waterbody and connected to one another to form a floating barrier to vessel passage, each of said float sections comprising:
      an elongated buoyant flotation tube having a length and a longitudinal axis;
      a plurality of fence sections attached to said flotation tube spaced apart around a circumference of said flotation tube and extending radially outwardly therefrom, said fence sections spanning substantially the entirety of said length of said flotation tube, each of said fence sections comprising:
- a plurality of fence posts attached to said flotation tube and extending radially outwardly therefrom, and
- fence connecting members spanning the space between said fence posts, said flotation tube having sufficient buoyancy to support said flotation tube and said fence sections at the surface of said waterbody, and wherein when said flotation tube and fence sections are positioned on said waterbody surface at least one of said fence sections extends a sufficient distance radially outward from said flotation tube and above said waterbody surface so as to create an obstacle to vessel passage over said flotation tube, the direction of vessel movement toward said flotation tube defining an approach side of said flotation tube, with the opposite side of said flotation tube defining a protected side;

connectors disposed between adjacent float sections, said connectors rotationally locking said adjacent float sections to one another such that all float sections rotate together;

wherein one or more of said fence posts comprises a section angled toward the direction of an approaching vessel;

said fence connecting members comprise a nylon net; and further comprising support members connecting at least some of said fence posts to one another about a circumference of said flotation tube.

17. The waterfront barrier system of claim 16, wherein at least one fence section extends upwardly from each flotation tube; and
- one of said fence sections extends outwardly from each flotation tube and generally along the surface of said waterbody, on said approach side of said flotation tubes; and
- further comprising a ballast member attached to one or more of said flotation tubes and extending downwardly below the surface of said waterbody, said ballast member providing resistance to rotation of said flotation tubes about said longitudinal axis, caused by a vessel strike.

18. The waterfront barrier system of claim 16, wherein at least one fence section extends upwardly from each flotation tube; and
- one of said fence sections extends outwardly from each flotation tube and generally along the surface of said waterbody, on said approach side of said flotation tubes; and
- further comprising a stabilizer float member attached to said flotation tube and extending radially outward from said flotation tube on said protected side of said flotation tube.

* * * * *